United States Patent
Yamamoto et al.

[11] Patent Number: 6,049,156
[45] Date of Patent: *Apr. 11, 2000

[54] APPARATUS PROVIDED WITH A VIBRATION TYPE MOTOR

[75] Inventors: Shinji Yamamoto, Yokohama; Kenichi Kataoka, Kawasaki; Tadashi Hayashi, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/992,445

[22] Filed: Dec. 17, 1997

[30] Foreign Application Priority Data

Dec. 20, 1996 [JP] Japan ................... 8-341922

[51] Int. Cl.$^7$ ........................................ H02N 2/00
[52] U.S. Cl. ........................................ 310/316.01
[58] Field of Search .................................. 310/316, 317

[56] References Cited

U.S. PATENT DOCUMENTS

| | | | |
|---|---|---|---|
| 5,001,404 | 3/1991 | Kataoka | 318/116 |
| 5,004,964 | 4/1991 | Kataoka et al. | 318/128 |
| 5,157,300 | 10/1992 | Kataoka et al. | 310/323 |
| 5,285,134 | 2/1994 | Kataoka | 318/116 |
| 5,436,521 | 7/1995 | Kataoka | 310/317 |
| 5,459,369 | 10/1995 | Mitarai et al. | 310/317 |
| 5,459,370 | 10/1995 | Kataoka | 310/317 |
| 5,461,273 | 10/1995 | Kawasaki et al. | 310/316 |
| 5,484,216 | 1/1996 | Kimura et al. | 400/319 |
| 5,539,268 | 7/1996 | Kataoka | 310/316 |
| 5,631,516 | 5/1997 | Kataoka | 310/316 |
| 5,841,215 | 11/1998 | Takeishi | 310/316 |

FOREIGN PATENT DOCUMENTS

| | | |
|---|---|---|
| 0 654 889 | 5/1995 | European Pat. Off. . |
| 0 702 417 | 3/1996 | European Pat. Off. . |
| 5-328757 | 12/1993 | Japan . |
| 6-237584 | 8/1994 | Japan . |

*Primary Examiner*—Thomas M. Dougherty
*Attorney, Agent, or Firm*—Fitzpatrick, Cella Harper & Scinto

[57] ABSTRACT

The driving control of a vibration type motor for driving, for example e.g., the drum of a copying apparatus is controlled wherein, in a printing operation, the driving control of the motor is effected by amplitude control, and in the initial operation after the closing of a power source switch (i.e., during the start-up), the driving control of the motor is effected by frequency control, whereby appropriate driving control is effected in accordance with the type of work performed by the apparatus.

16 Claims, 9 Drawing Sheets

APPARATUS PROVIDED WITH A VIBRATION TYPE MOTOR

BACKGROUND OF THE INVENTION

1. Field of the Invention

This invention relates to the control of a drive source, and particularly to the control of a vibration type actuator that generates a driving force using vibration energy.

2. Related Background Art

There have heretofore been made many propositions regarding a control method for a vibration type actuator. In the-case of a vibration type actuator, the rotational velocity thereof is often controlled by the frequency (driving frequency) or the amplitude (driving voltage) of a frequency signal applied to a vibration member.

The relation between the driving frequency and the rotational velocity is as shown in FIG. 10 of the accompanying drawings. The rotational velocity has a characteristic in that, with respect to the resonance frequency of the vibration member as a peak, it has a gentle slope on the high frequency side and a steep slope on the low frequency side. Also, the velocity varies in accordance with the driving voltage as shown in FIG. 10.

When velocity control of the vibration type actuator is to be effected by changing the driving voltage, the frequency must be made approximate to and higher than the resonance frequency of the vibration type actuator; however, the resonance frequency also varies with changes in the environment, such as temperature and load, and therefore cannot be completely fixedly controlled On the other hand, when velocity control is to be effected by changing the driving frequency, even if environmental factors such as temperature, load, and the like change, control conforming thereto can be effected.

As means for generating a frequency signal of any frequency, use is often made of a VCO (voltage control oscillator). The VCO can output a signal of a frequency conforming to the magnitude of a voltage input thereto, and can obtain a high power resolution of a relatively fine frequency. Therefore, if the VCO is used when the velocity of the vibration type actuator is to be controlled by controlling the frequency, stable control can be effected.

However, when an attempt is made to reduce the cost of a circuit, it is conceivable to provide a construction which does not use an analog circuit such as the VCO, but frequency-divides a high clock pulse signal using a digital circuit (a gate array or the like) to thereby generate a pulse of a frequency corresponding to the frequency of a frequency signal, and to control the gate of a switching element on the primary side of a step-up transformer to thereby drive the vibration type actuator.

The higher the frequency of the frequency-divided clock, the finer can be made the resolution power of the driving frequency. However the frequency of the clock pulses which can be used in the gate array is limited and therefore, the resolution power cannot be increased as much as by using a VCO. If an attempt is made to control the speed of the vibration type actuator only by varying the frequency, there arises the problem that velocity irregularity becomes great.

So, as means for controlling the driving speed of the vibration type actuator, there have been made several propositions for controlling it by combining control of the amplitude and frequency of an AC signal of two phases input to the actuator and the phase difference between the two phases.

For example, in Japanese Laid-Open Patent Application No. 64-85587, there is proposed a technique of sweeping the driving frequency of a vibration type actuator from a higher frequency toward a lower frequency, fixing the frequency when the velocity has reached a predetermined velocity and then controlling a driving voltage or a pulse width to thereby control the velocity.

Also, Japanese Laid-Open Patent Application No. 5-328757 proposes a technique of controlling the velocity so as to become constant by controlling the pulse signal width of a pulse input to the power amplifying portion of a vibration type actuator in accordance with a driving voltage, and controlling a driving frequency so that the pulse width as the controlled result may assume a predetermined value.

Further, Japanese Laid-Open Patent Application No. 6-237584 proposes a technique of controlling the frequency at a first step to thereby control the velocity so as to approach a target velocity when the frequency and voltage amplitude or the frequency and the phase difference of an input AC signal of two phases of a vibration type actuator are to be controlled, fixing the frequency when the velocity has reached a certain velocity range, and thereafter controlling the velocity so as to approach the target value by controlling the voltage amplitude or the phase difference of the AC signal of two phases or, on the other hand, controlling the velocity again by controlling the frequency when the difference from the target velocity is greater than or equal to a certain value thereafter.

However, according to the technique proposed by Japanese Laid-Open Patent Application No. 64-85587, the driving frequency is fixed during a start-up period, and this leads to the undesirable possibility that the fixed frequency diverges from the resonance frequency, whereby a predetermined velocity (number of revolutions) cannot be output. Also, when conversely the fixed frequency becomes too close to the resonance frequency, and particularly when the target velocity is low, there is the undesirable possibility that the driving voltage may be reduced to a level at which the vibration type actuator stops.

Also, according to the techniques proposed by Japanese Laid-Open Patent Application No. 5-328757 and Japanese Laid-Open Patent Application No. 6-237584, after the velocity has reached a steady velocity, control is effected chiefly by controlling the driving voltage and, when due to changes in temperature, load, etc., control becomes impossible by varying only the driving voltage, the driving frequency is changed to thereby make control by varying the driving voltage again possible. However when the generation of the frequency is performed using a digital circuit, the resolution power of the frequency becomes bad, and this leads to the undesirable possibility that the fluctuation of the velocity becomes great even if the frequency is changed by a minimum step. Particularly, when high accuracy of the number of revolutions (rotational velocity) is required as is the case in the rotation of a developing drum or the like of a copying apparatus, if the driving frequency is changed during image formation and transfer, there is the possibility that the number of revolutions of the drum will fluctuate greatly and the quality of printing is degraded.

SUMMARY OF THE INVENTION

It is an object of the present invention to provide a driving control apparatus capable of driving a drive source (particularly a vibration type actuator) stably and highly accurately with as simple control as possible, and an apparatus such as a copying apparatus provided with the same.

One aspect of the application is to provide an apparatus having a vibration type motor which provides as the driving modes of the vibration type motor, a first mode for changing a frequency and a second mode for changing a voltage (a voltage applied to an electro-mechanical energy converting element) or a phase difference, wherein these modes are selected in accordance with the type of work to be performed by the apparatus.

One aspect of the application is to provide an apparatus which operates in the second mode in the case of work for which high accuracy is required and operates in the first mode in the case of work for which such high accuracy is not required.

One aspect of the application is to provide an apparatus which constitutes a copying apparatus and which operates in the second mode during a printing operation and operates in the first mode during an initial start-up operation when a power source switch is closed.

Other objects of the present invention will become apparent from the following description of some embodiments of the invention taken in conjunction with the accompanying drawings.

DESCRIPTION OF THE PREFERRED EMBODIMENTS

First Embodiment

Figure 2:
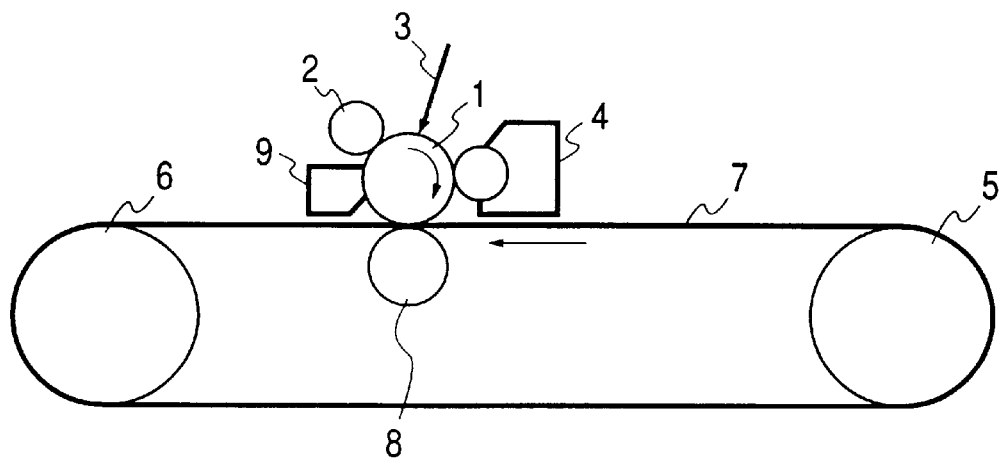
FIG. 2 shows the construction of the essential portions of the printer portion of the copying apparatus.

FIG. 2 shows the construction of the essential portions of the printer portion of a copying apparatus which is a first embodiment of the present invention. Generally a copying apparatus comprises a reader portion for reading the image of an original and a printer portion for transferring the read image to paper or the like, but the reader portion is not particularly related to the present invention and therefore need not be described herein.

Figure 3:
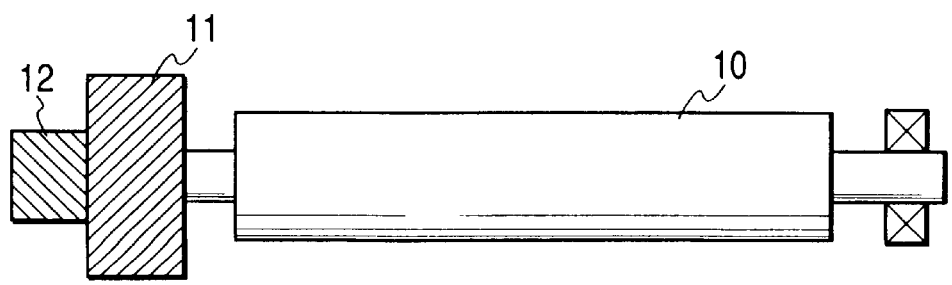
FIG. 3 shows the construction of the photosensitive drum of the printer portion.

In FIG. 2, reference numeral 1 designates a photosensitive drum (a developing member) on the surface of which a photo-conductive layer 10 is formed, as shown in FIG. 3. The photosensitive drum 1 is rotated in the direction of a thin arrow in FIG. 2, charges are imparted thereto by a charger 2, and exposure is effected in the direction of a thick arrow by an exposure device 3, whereby a latent image is formed on the photoconductive layer 10. This latent image is toner-developed by a developing device 4, whereby a visual image is formed.

The conveyance of a sheet (a transfer member), not shown, is effected by a sheet conveying belt 7 driven by a drive pulley 5 and a driven pulley 6, and the transfer of the toner image onto the sheet is effected by a transfer device 8, whereby a desired image can be formed on the sheet. After the transfer, any excess toner remaining untransferred on the photoconductive layer 10 of the photosensitive drum 1 is removed by a cleaning device 9.

The sheet onto which the toner image has been transferred is conveyed to a fixing device, not shown, by the conveying belt 7, and the toner image is fixed on the sheet.

FIG. 3 shows the detailed construction of the photosensitive drum 1. In this figure, reference numeral 11 denotes a vibration type motor (vibration type actuator). This vibration type motor 11 comprises a stator having an electro-mechanical energy converting element secured to a resilient member and a rotor urged against the stator. An output shaft is mounted on the rotor. In the vibration type motor 11, an AC wave in the vicinity of the resonance frequency of the resilient member is applied to the electro-mechanical energy converting element to thereby generate a travelling vibration wave in the resilient member, and the rotor is frictionally driven by this travelling vibration wave.

An encoder 12 is mounted on one end of the output shaft of the vibration type motor 11, and this encoder 12 outputs a pulse conforming to the rotational velocity of the vibration type motor 11.

The photosensitive drum 1 having the photoconductive layer 10 and thereby having the function of an image bearing member is directly driven from the output shaft of the vibration type motor 11 without the intermediary of a gear and a belt. Since the rotational accuracy of the drive source directly becomes the rotational accuracy of the photosensitive drum 1 having the photoconductive layer 10, the controllability of the rotational velocity of the vibration type motor 11 which is the drive source can be sufficiently enhanced the fluctuation of the rotational velocity may be made sufficiently low, and the accuracy of the photosensitive drum 1 itself may be enhanced to thereby sufficiently suppress the vibration of the photosensitive drum 1, whereby a highly accurate and stable rotation of the photosensitive drum 1 can be secured easily as compared with the prior art.

Figure 1:
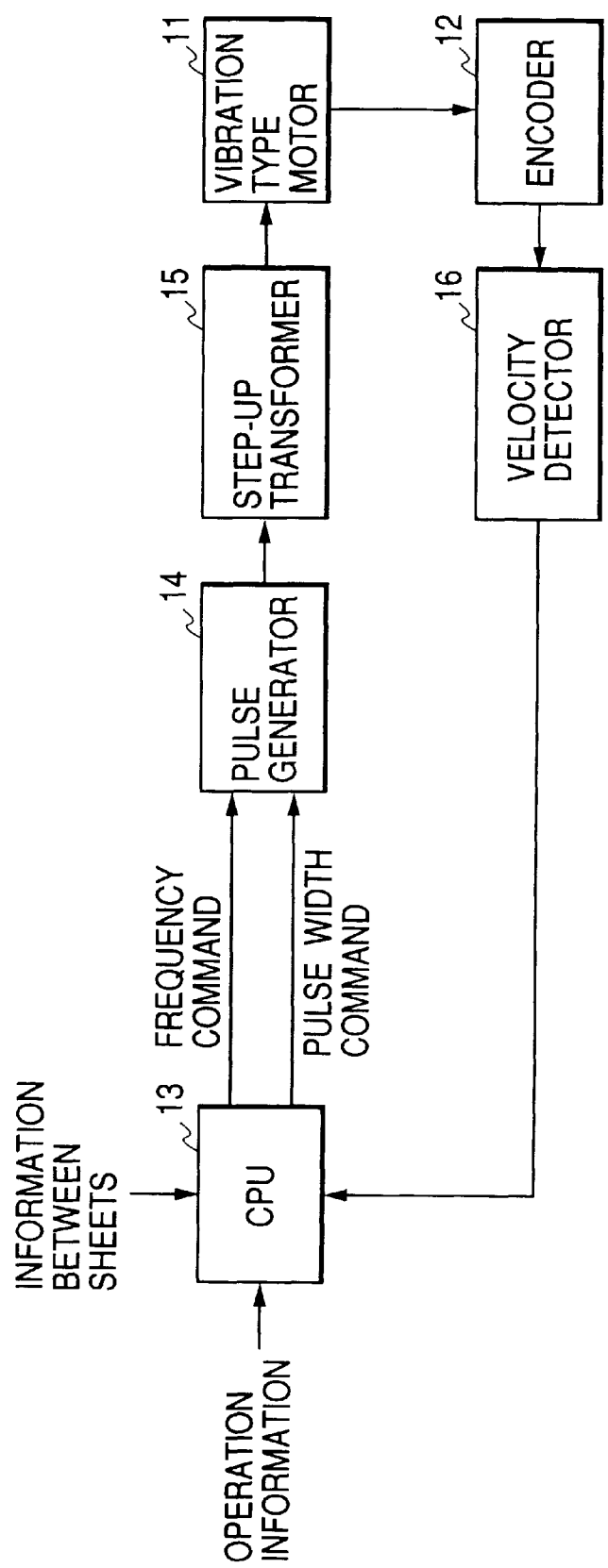
FIG. 1 is a block diagram of the control portion of a copying apparatus which is a first embodiment of the present invention.

A method of controlling the vibration type motor will now be described. FIG. 1 shows a control portion for effecting control of the rotational velocity of the vibration type motor 11. In FIG. 1, rotation information of the vibration type motor 11 is converted into a pulse signal by the encoder 12, and pulse signal converted into velocity information by a velocity detector 16 is input to a CPU 13. In the velocity detector 16, the pulse frequency (frequency of pulse generated by the encoder 12) or the time of a period between pulses is measured and input as information of multiple bits to the CPU 13. The CPU 13 determines the velocity information input from the velocity detector 16, together with the current operation of the copying apparatus from operation information and information between sheets, and determines the frequency and pulse width of a pulse signal for generating an AC wave (frequency signal) to be input to the vibration type motor 11.

A pulse generator (pulse width and frequency generate means) 14 generates two pulse signals having a phase difference of 90° respectively in terms of time and having a frequency corresponding to frequency information input from the CPU 13 and assuming a high level for a time conforming to the pulse width information. These two pulse signals which have different phases are amplified to a voltage sufficient to drive the vibration type motor 11 by a step-up transformer 15, and are input to the vibration type motor 11.

The vibration type motor 11 is driven both when the copying apparatus is effecting printing (the exposure of the photosensitive drum 1 and the transfer of a toner image to a sheet) and when it is not effecting printing. When the copying apparatus is printing an image, the velocity accuracy of the vibration type motor 11 affects the accuracy of the rotational velocity of the photosensitive drum driven thereby and, therefore, high accuracy of the rotational velocity is required. On the other hand, when the copying apparatus is not printing, such high accuracy of the rotational velocity is not necessary.

Figure 4:
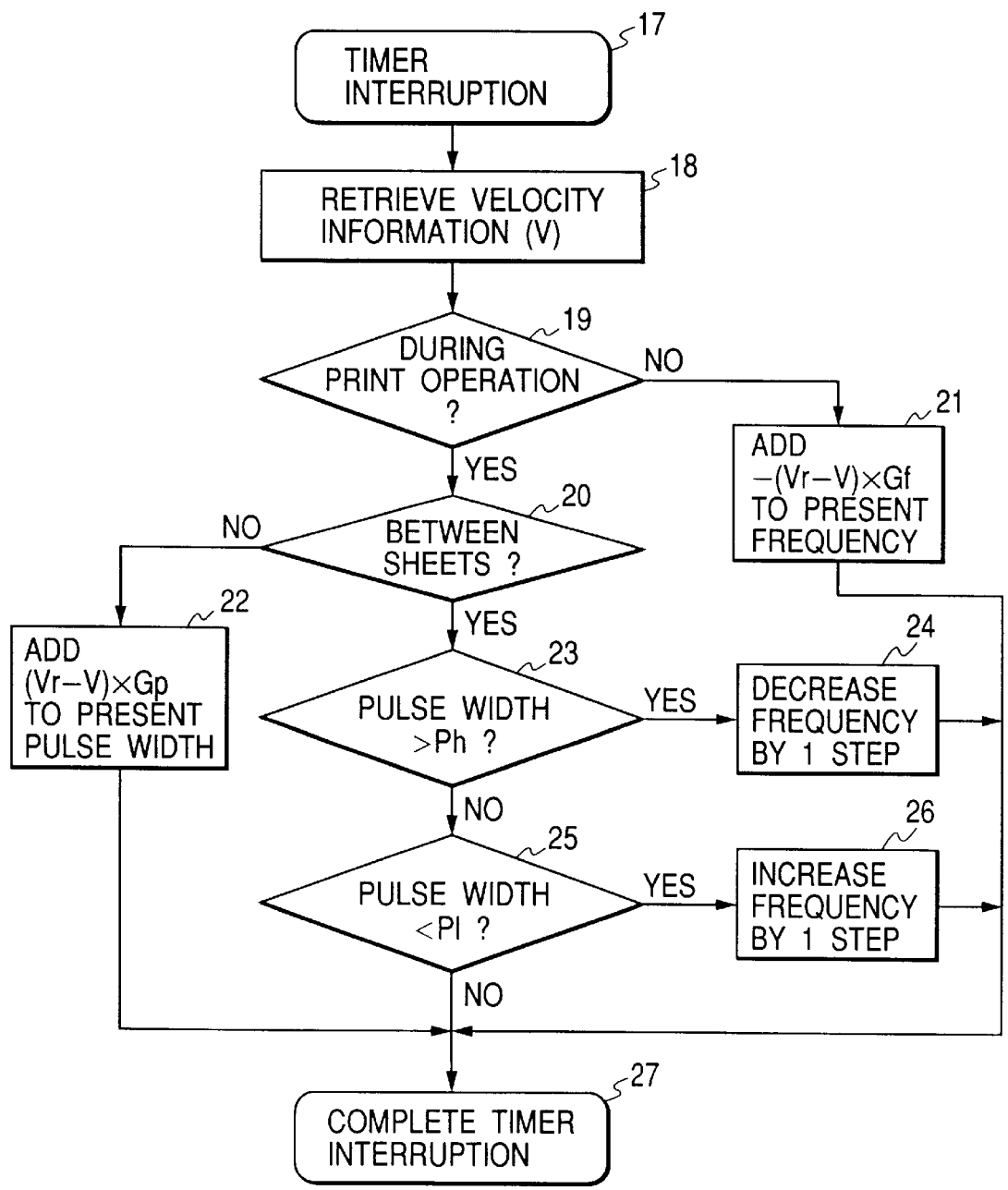
FIG. 4 is a flow chart showing the operation of the control portion.

So, in the present embodiment, the CPU 13 determines whether high accuracy of the rotational velocity is required, and in accordance with the accuracy requirement, it controls the pulse signal to be generated by the pulse generator 14. The operation of the CPU 13 will hereinafter be described with reference to the flowchart of FIG. 4.

In the CPU 13, timer interruption is generated at each predetermined time, whereby control is effected at equal time intervals. At step 17, a timer interruption is generated, operation is advanced to step 18, where the current velocity information (V) is retrieved from the velocity detector 16.

At step 19, it is determined whether the copying apparatus is performing a printing operation from operation information input to the CPU 13. If the copying apparatus is not performing a printing operation, operation is advanced to step 21, and if the copying apparatus is performing a printing operation, operation is advanced to step 20. As examples in which the vibration type motor 11 is driven other than during a printing operation, there are (1) the time when each mechanism in the copying apparatus is checked immediately after the closing of the main switch of the copying apparatus (i.e., during start-up), (2) the time between the depression of a printing start button when the vibration type motor is in its stopped state and when the vibration type motor 11 is accelerated to a steady velocity, and (3) the time between when a printing operation is completed and a when sheet is discharged out of the copying apparatus.

Figure 10:
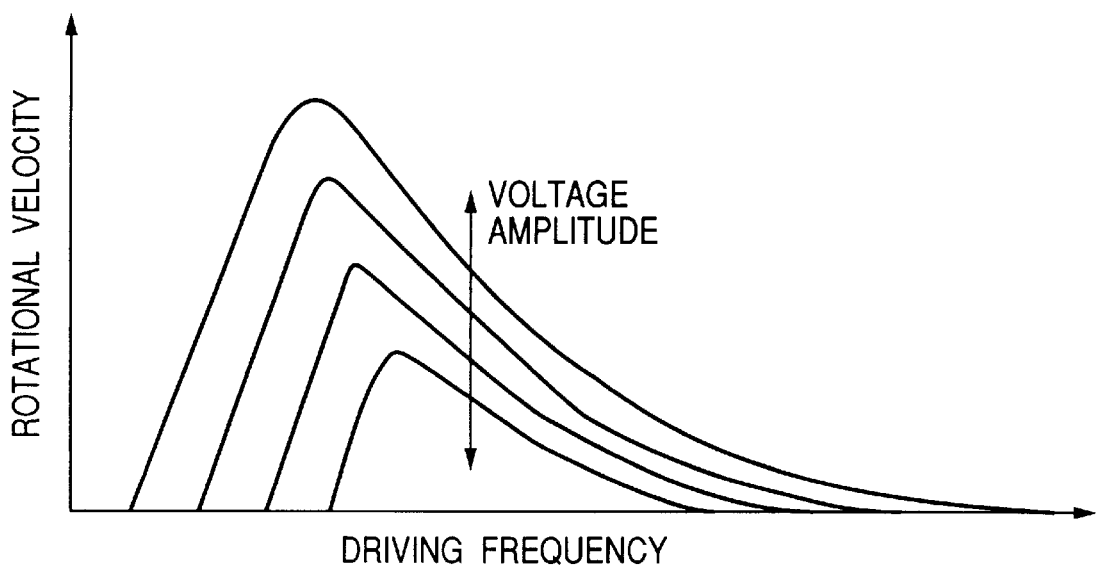
FIG. 10 is a graph showing the characteristic of a vibration type motor.

At step 21, the frequency of the pulse signal is changed in accordance with the detected velocity information (the driving velocity of the vibration type motor 11 is roughly changed). Specifically, $-(V_r-V) \times Gf$ is added to the frequency before it is changed. Here, $V_r$ is the target velocity of the vibration type motor 11, Gf is the control gain in frequency control, and V is the velocity detected at step 18. The frequency is always added to this value before it is varied and, thus, integration control of the velocity is effected, and a steady difference of the velocity is controlled so as to become 0. Generally, in a vibration type motor, the greater the frequency becomes (with the resonance frequency as the peak), the smaller the velocity becomes (see FIG. 10) a frequency higher than the resonance frequency, the velocity gradient is small and can be easily controlled, so that a minus sign is added to thereby reverse the sign.

When the operation of step 21 is terminated, advance is made to step 27, where timer interruption is completed and the frequency and pulse width of the pulse signal are held until the next timer interruption is generated.

On the other hand, at step 20, it is determined whether a sheet is passing the image transfer position of the photosensitive drum 1 (as when the copying apparatus is performing a printing operation but is continuously effecting the copying of a plurality of sheets) or whether a space between one sheet and another sheet (hereinafter referred to as between sheets) is passing the image transfer position of the photosensitive drum 1. Between sheets, the transfer of the image is not being effected, and high accuracy is not required of the driving velocity of the vibration type motor 11. When a sheet is passing the transfer position of the photosensitive drum 1, operation is advanced to step 22, and when the space between sheets is passing the transfer position, operation is advanced to step 23.

At step 22, the pulse width of the pulse signal is changed in accordance with the velocity information V detected at step 18 (the driving velocity of the vibration type motor is finely changed). Specifically, $(V_r-V) \times Gp$ is added to the pulse width it is before changed. Here, $V_r$ is the target velocity of the vibration type motor 11, and Gp is the control gain in pulse width control. In the pulse width control, integration control of the velocity is effected as in frequency control, and the steady velocity difference becomes 0. When the pulse width is thus determined, operation is advanced to step 27, where the frequency and pulse width of the pulse signal are held until the generation of the next interruption.

Generally, when the frequency of the driving voltage of the vibration type motor is fixed and the velocity is controlled by the pulse width input to the gate of a switching element connected to the primary side of a transformer, the range of variation in the velocity by the pulse width is limited. For example, when the pulse width is increased, the velocity increases to a certain value, but when this value is exceeded, the velocity no longer increases, and if the pulse width is further increased, the functions of the transformer and the switching element may be spoiled. Also, when the pulse width is decreased, the vibration type motor cannot be driven with a certain value as the boundary due to the insensitive zone (dead zone) of the vibration type motor.

So, it is necessary to set the frequency so that the pulse width may be within a predetermined range whenever pulse width control is effected. In order to accomplish this, the following steps 23 to 26 are provided. They will hereinafter be specifically described.

At step 23, it is determined whether the currently controlled pulse width is greater than a set value Ph. Here, Ph is a relatively great value within the variable range of the driving velocity by the control of the pulse width. It never happens that control becomes impossible at a point of time whereat the controlled pulse width becomes Ph, but eventually, if driving is continued at the frequency at this point of time, control may become impossible. Therefore, when the pulse width becomes greater than Ph, operation is advanced to the step 24, where the frequency of the pulse signal is decreased by 1 step to thereby make the driving frequency approach the resonance frequency. As a result, the controlled pulse width becomes smaller.

At step 25, it is determined whether the currently controlled pulse width is smaller than a set value P1. P1 is a relatively small value within the variable range of the driving velocity by the control of the pulse width. It never happens that control becomes impossible at a point of time whereat the controlled pulse width becomes P1, but eventually if driving is continued at this frequency, control may become impossible. Therefore, when the pulse width becomes smaller than P1, operation is advanced to step 26, where the frequency of the pulse signal is increased by 1 step to thereby keep the driving frequency from approaching the resonance frequency. As a result, the pulse width becomes greater.

The reason why the amount of change in the frequency at steps 24 and 26 is 1 step is that the adjustment of the frequency at steps 23 and 24 or steps 25 and 26 is effected each time the space between sheets arrives at the transfer position of the photosensitive drum 1, and is effected with high frequency for a change in the resonance frequency of the vibration type motor 11. Therefore, if the frequency is changed by 1 step, it is sufficient. When at step 24 and step 26, the change in the frequency is completed, operation is advanced to step 27, where the timer interruption is terminated.

As described above, in the present embodiment, it is determined whether the current operation of the copying apparatus is an operation which requires high accuracy of the driving velocity of the vibration type motor 11. If it is an operation which requires high accuracy, then pulse width control (driving voltage control) for finely changing the driving velocity is effected and a stable image of high quality can be formed. On the other hand, if the current operation of the copying apparatus is not an operation which requires high accuracy, frequency control for roughly changing the driving velocity is effected, e.g., to thereby cope with the fluctuations of temperature and load. Therefore, control can be simplified as compared with a case where pulse width control is additionally effected.

Second Embodiment

Figure 5:
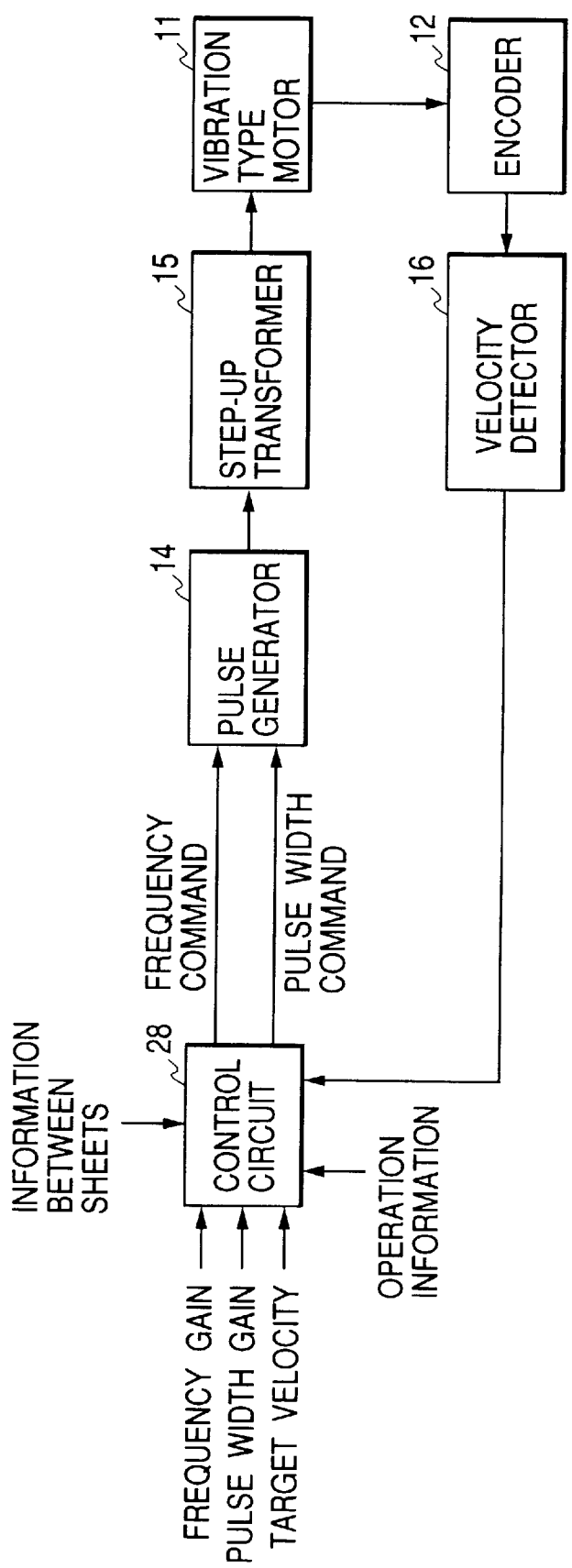
FIG. 5 is a block diagram of the control portion of a copying apparatus which is a second embodiment of the present invention.

FIG. 5 shows the construction of the control portion of a copying apparatus which is a second embodiment of the present invention. The construction of the copying apparatus itself is similar to that of the first embodiment. In the first embodiment, the control of the vibration type motor 11 is performed by software, using a CPU, whereas in the present embodiment, control of is performed by hardware, using a control circuit 28.

In FIG. 5, the gain of frequency control, the gain of pulse width control and a target velocity are externally input to the control circuit 28. These are designed to be input from a host CPU, not shown.

Figure 6:
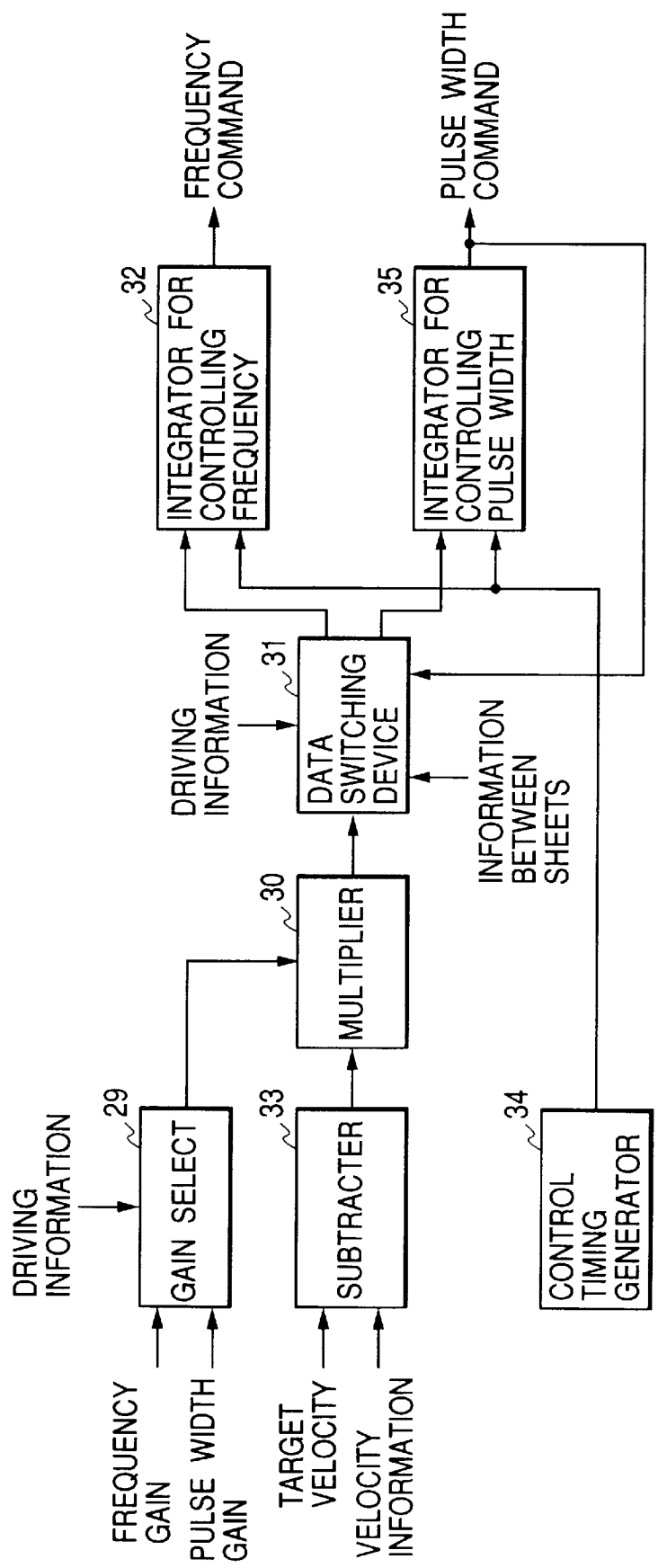
FIG. 6 is a block diagram of a control circuit in the control portion.

FIG. 6 shows the internal construction of the control circuit 28. The velocity detected by the velocity detector 16 of FIG. 5 is input as velocity information to the subtractor 33 of FIG. 6. The subtractor 33 outputs to multiplier 30 the difference between the externally input velocity information and target velocity.

Driving information indicative of whether a printing operation is being performed or any operation than printing is being performed is inputted to a gain selector 29. The gain selector 29 selects a pulse width gain and outputs it to the multiplier 30 when a printing operation is being performed, and selects a frequency gain and outputs it to the multiplier 30 when any operation other than the printing operation is being performed.

The multiplier 30 is comprised of a logic element such as an adder or a shifter, and outputs the product of two input data of multiple bits. This multiplier 30 may also be comprised of a look-up table. The multiplier 30 effects the multiplication of the velocity difference input from the subtractor 33 by the gain input from the gain selector 29, and outputs the result to a data switching device 31.

The driving information and information indicative of whether a space between sheets is passing (or a sheet is passing) the transfer position of the photosensitive drum 1 during a priority operation are input to the data switching device 31. On the basis of such input information, the data switching device 31 outputs addition data in accordance with the respective operations to an integrator 32 for controlling frequency and an integrator 35 for controlling pulse width. Specifically, except during the printing operation, the data input from the multiplier 30 is output to the integrator 32 for controlling frequency and, at the same time, 0 is output to the integrator 35 for controlling pulse width. On the other hand, when a printing operation is being performed and a sheet is passing the transfer position of the photosensitive drum, the data input from the multiplier 30 is output to the integrator 35 for controlling pulse width and, at the same time, 0 is output to the integrator 32 for controlling frequency. Further, when a printing operation is being performed but the space between sheets is passing the transfer position of the photosensitive drum, 0 is output to the integrator 35 for controlling pulse width and, at the same time, when the value of a pulse width command input from the integrator 35 for controlling pulse width is greater than the set value Ph, the data input to the integrator 32 for controlling frequency is made into −1, and when the value of the pulse width command is smaller than the set value P1, +1 is output to the integrator 32 for controlling frequency, and when the value of the pulse width command is between Ph and P1, 0 is output to the integrator 32 for controlling frequency.

The set values Ph and P1 are the same as those described in the first embodiment, and values which are not uncontrollable at the pulse width but are approximate to uncontrollable values are set as these set values.

A control timing generator 34 generates timing for effecting control. The control timing generator 34 is comprised of a counter, and counts system clock pulses and outputs a signal assuming a high level by one clock pulse of the system clock pulses at each set time period.

The integrator 32 for controlling frequency and the integrator 35 for controlling pulse width are each comprised of a register and an adder, and add data input from the data switching device 31 at each timing input from the control timing generator 34 and data held in the register, and hold the added value in the register. The value held in the register is output as a frequency command or a pulse width command from the control circuit 28, and is input to the pulse generator 14.

By use of the control circuit 28 also, as described above, as in the first embodiment, when the current operation of the copying apparatus is an operation which requires high accuracy of the driving velocity of the vibration type motor 11, pulse width control (driving voltage control) for finely changing the driving velocity can be effected to thereby form a stable image of high quality. On the other hand, when the current operation of the copying apparatus is not an operation which requires high accuracy, frequency control for roughly changing the driving speed is effected, e.g., to thereby roughly cope with the fluctuations of temperature and load. Therefore, control can be simplified as compared with a case where pulse width control is additionally effected.

Third Embodiment

Figure 7:
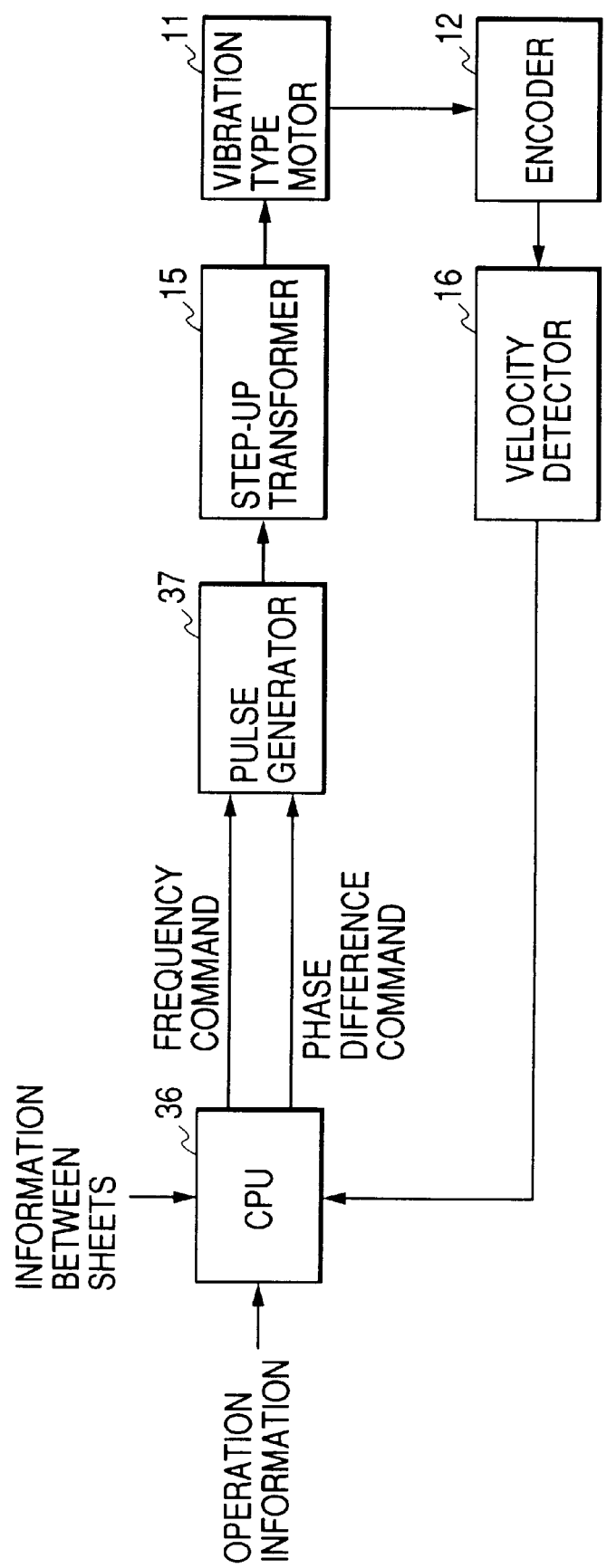
FIG. 7 is a block diagram of the control portion of a copying apparatus which is a third embodiment of the present invention.

FIG. 7 shows the control portion of a copying apparatus which is a third embodiment of the present invention. The construction of the copying apparatus itself is similar to that of the first embodiment. In the present embodiment, pulse width control effected in the first embodiment is replaced by phase difference control.

As described with respect to the prior art, the control of the velocity of the vibration type motor can also be effected by changing the phase difference of two input AC signals which have different phases in terms of time. Generally, the velocity of the vibration type motor becomes maximum when a phase difference between the AC signals is plus 90° or minus 90° (note, the direction of rotation differs between plus 90° and minus 90°). When the phase difference becomes smaller (or greater) than plus 90° or minus 90°, the velocity is reduced.

Figure 8:
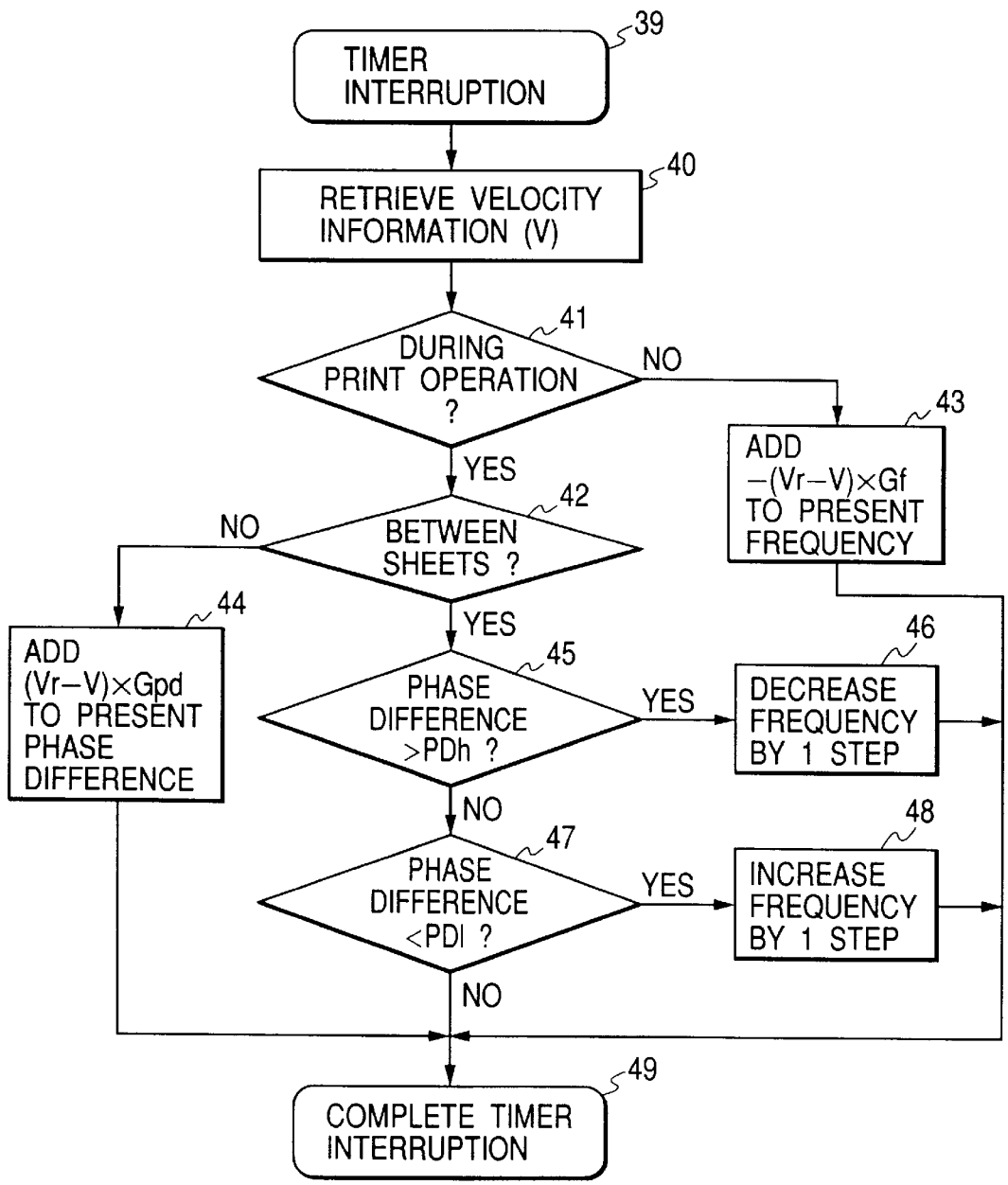
FIG. 8 is a flow chart showing the operation of the control portion in the third embodiment.

FIG. 8 shows the flow of the operation of the CPU 36 of FIG. 7. In the CPU 36, timer interruption is generated at each predetermined time, whereby control is effected at equal time intervals. At step 39, timer interruption is generated, and operation is made to step 40, where the current velocity information (V) is retrieved from the velocity detector 16.

At step 41, is determined whether the copying apparatus is performing a printing operation based on operation information input to the CPU 36. If the copying apparatus is not performing a printing operation, operation is advanced to step 43, and if the copying apparatus is performing a printing operation, operation is advanced to step 42.

At step 43, the frequency of the pulse signal is changed in accordance with the detected velocity information (the driving velocity of the vibration type motor 11 is roughly changed). Specifically, $-(V_r-V) \times Gf$ is added to the frequency before it is changed. Here, $V_r$ is the target velocity of the vibration type motor 11, and Gf is the control gain in frequency control. The frequency is always added to the value before it is changed and thus, integration control of the velocity is effected, and a steady difference in the velocity is controlled so as to become 0. The reason why minus is given to reverse the of the value is that generally in the vibration type motor, the greater the frequency becomes (with the resonance frequency as the peak), the smaller the velocity becomes (see FIG. 10); at a frequency higher than the resonance frequency, the velocity gradient is small, and can be controlled easily.

When the operation of step 43 is terminated, operation is advanced to step 49, where the timer interruption is completed, and the frequency and pulse width of the pulse signal are held until the next timer interruption is generated.

On the other hand, at step 42, it is determined whether a sheet or the space between sheets is passing the image transfer position of the photosensitive drum 1, as when the copying apparatus is performing the printing operation but is continuously effecting the copying of a plurality of sheets. If a sheet is passing the transfer position, operation is advanced to step 44, and if a space between sheets is passing the transfer position, operation is advanced to step 45.

At step 44, $(V_r-V) \times Gpd$ is added to the phase difference. Gpd is the control gain in frequency control.

At step 45 and step 47, it is determined whether the phase difference being controlled is within a predetermined range, and the frequency is charged in accordance with the result. As described above, the phase difference is of a velocity characteristic in which plus 90° or minus 90° is the peak and, therefore, the range of the phase difference being controlled is realized on both the side on which the phase difference is greater than 90° (or minus 90°) and the side on which the phase difference is smaller than 90° (or minus 90°).

When the phase difference is greater than PDh, operation is advanced to step 46, where the frequency of the pulse signal is decreased by 1 step to thereby make the driving frequency approach the resonance frequency. As a result, the phase difference controlled becomes smaller. When the phase difference is smaller than PDh, operation is advanced to step 48, where the frequency of the pulse signal is increased by 1 step to thereby keep the driving frequency from approaching the resonance frequency. As a result, the phase difference controlled becomes greater.

After the operations of steps 46 and 48 have been terminated, operation is advanced to step 49, where the timer interruption is completed.

As described above, in the present embodiment, it is determined whether the current operation of the copying apparatus is an operation which requires high accuracy of the driving velocity of the vibration type motor 11, and when the current operation is an operation which requires high accuracy, phase difference control for finely changing the driving velocity can be effected to thereby form a stable image of high quality. On the other hand, when said current operation is not an operation which requires high driving velocity, e.g., to thereby only roughly cope with the fluctuations of temperature and load, control can be simplified as compared with a case where phase difference control is additionally effected.

Fourth Embodiment

Figure 9:
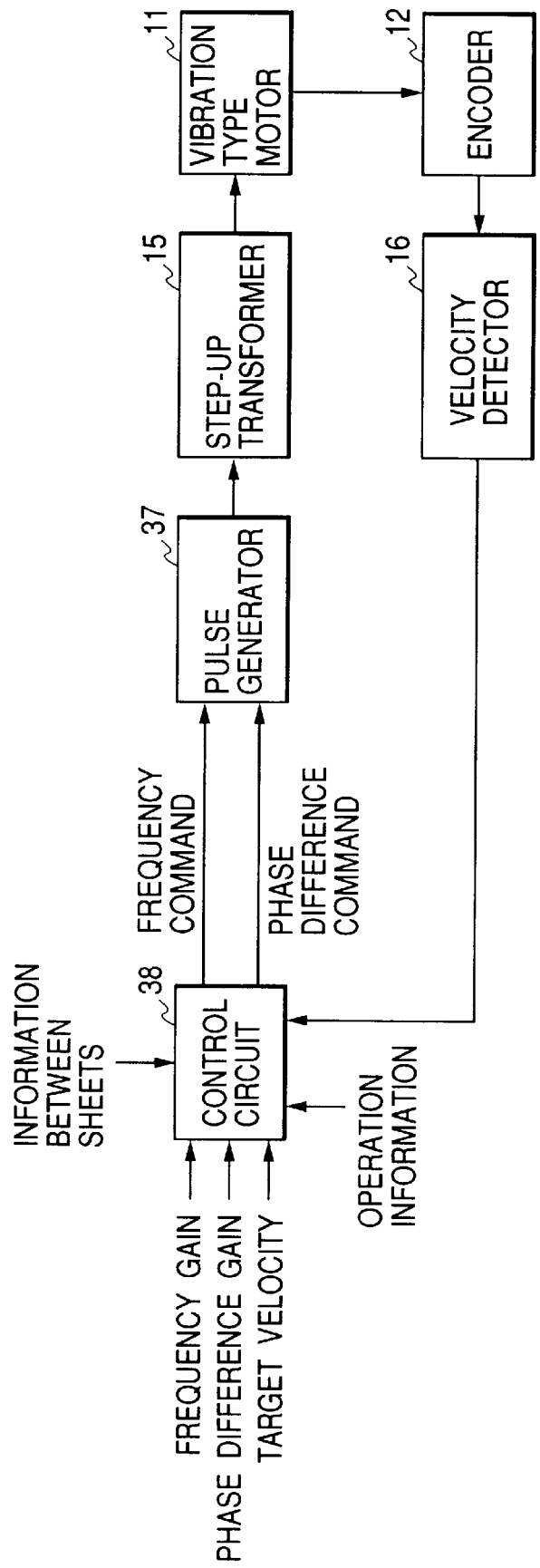
FIG. 9 is a block diagram of the control portion of a copying apparatus which is a fourth embodiment of the present invention.

FIG. 9 shows the control portion of a copying apparatus which is a fourth embodiment of the present invention. The construction of the copying apparatus itself is similar to that of the first embodiment. In the third embodiment, the control of the vibration type motor 11 is effected software, using a CPU, whereas in the present embodiment, it is effected by hardware using a control circuit 38.

In FIG. 9, the gain of frequency control, the gain of phase difference control and the target velocity are externally input to the control circuit 38. These are designed to be input from a host CPU, not shown. The internal construction of the control circuit 38 is substantially the same as the internal construction of the control circuit 28 shown in FIG. 5, and differs from the latter as follows: (1) that which corresponds to the gain selector 29 of FIG. 6 selects a phase difference gain when a printing operation is being performed, and selects a frequency gain when any operation other than a printing operation is being performed, and (2) that when a printing operation is being performed, that which corresponds to the integrator 35 for controlling pulse width in FIG. 6 outputs a phase difference command when a printing operation is being performed and a sheet is passing the transfer position of the photosensitive drum.

By the use of such a control circuit 38, as in the third embodiment, when the current operation of the copying apparatus is an operation which requires high accuracy of the driving velocity of the vibration type motor 11, phase difference control for finely changing the driving velocity can be effected to thereby form a stable image of high quality. On the other hand, when the current operation is not an operation which requires high accuracy, frequency control for roughly changing the driving velocity is effected, e.g., to thereby only roughly cope with fluctuations of temperature and load. Therefore, control can be simplified as compared with a case where phase difference control is additionally effected.

Figure 11:
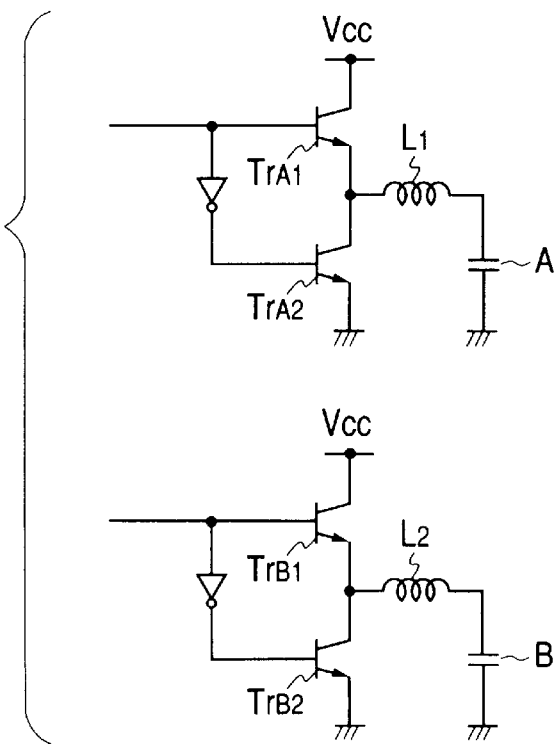
FIG. 11 is a circuit diagram showing the construction of a step-up transformer in each embodiment of the present invention.

The step-up transformer 15 in each embodiment, as shown, for example, in FIG. 11, is comprised of driving circuits comprising coils and transistors provided for a piezoelectric member A for A phase and a piezoelectric member B for B phase, respectively, disposed at difference locations on a vibration member constituting the motor. A pulse signal is applied from the pulse generator 14 to the base of the transistor TrA1 of the driving circuit for A phase, and a pulse signal having a phase difference relative to the above-mentioned pulse signal is applied to the base of the transistor TrB1 of the driving circuit for B phase.

In each of the above-described embodiments, when a highly accurate operation is not required of the vibration type motor, only the control for roughly changing the driving velocity is effected; however, alternatively, rough change control and fine change control may be effected in combination.

Also, each of the above embodiments has been described with respect to a case where pulse width control or phase difference control is used as control for finely changing the driving velocity of the vibration type motor 11 and frequency control is used as control for roughly changing the driving velocity, but there is a case where depending on the construction of the pulse generator, the resolution power of the frequency is fine and the resolution power of the pulse width or the phase difference is rough; in such case, frequency control may be used as control for finely changing the driving velocity and pulse width control or phase difference control may be used as control for roughly changing the driving velocity.

Also, each of the above embodiments has been described with respect to a case where the vibration type motor is used as the drive source for a photosensitive drum of a copying apparatus, but the present invention can also be applied to the drive source of any apparatus other than a copying apparatus.

What is claimed is:

1. An apparatus that uses a driving force to perform a plurality of types of work, said apparatus comprising:
   a vibration type motor including a vibration member and first and second electro-mechanical energy converting element portions disposed on said vibration member;
   a driving circuit that generates first and second frequency signals having different phases and respectively applies the first and second frequency signals to said first and second electro-mechanical energy converting element portions to generate a vibration in said vibration member, thereby generating a driving force of the vibration type motor, said driving circuit being operable in a first mode in which said driving circuit varies the frequencies of the first and second frequency signals applied to said electro-mechanical energy converting element portions to effect driving control, and a second mode in which said driving circuit varies a voltage of the first and second frequency signals applied to said electro-mechanical energy converting element portions to effect driving control; and
   a switching circuit that selectively switches the mode of operation of the driving circuit to the first mode or the second mode in accordance with the type of work being performed by said apparatus.

2. An apparatus according to claim 1, wherein said switching circuit includes a selecting circuit that selects the second mode when the type of work being performed by said apparatus is a first predetermined type of work which requires high driving accuracy, and selects the first mode when the type of work being performed by said apparatus is a second predetermined type of work which does not require high driving accuracy.

3. An apparatus according to claim 1, wherein said driving circuit includes a switching element that opens and closes in response to a pulse signal, applies a driving frequency signal to said electro-mechanical energy converting element portions by an ON-OFF operation of said switching element, and changes a pulse width of the pulse signal in the second mode, wherein a voltage level of the frequency signal applied to the electro-mechanical energy converting element portions varies in accordance with a change in the pulse width of the pulse signal.

4. An apparatus according to claim 1, further comprising detection means for detecting the type of work being performed by said apparatus, wherein said switching circuit switches between the first mode and the second mode on the basis of a detection result by said detection means.

5. An apparatus according to claim 1, wherein in the first mode said driving circuit varies the frequencies of the frequency signals applied to said electro-mechanical energy converting element portions in accordance with a difference between a target velocity and a current velocity, and in the second mode the driving circuit varies the voltage of the frequency signals applied to said electro-mechanical energy converting element portions in accordance with the difference between the target velocity and the current velocity.

6. An apparatus according to claim 1, wherein in the first mode said driving circuit varies the frequencies of the frequency signals applied to said electro-mechanical energy converting element portions in accordance with a difference between a target velocity and a current velocity, and in the second mode the driving circuit varies the voltage of the frequency signals applied to said electro-mechanical energy converting element portions in accordance with the difference between the target velocity and the current velocity.

7. An apparatus according to claim 1, wherein said apparatus prints or types on a recording medium.

8. An apparatus according to claim 7, wherein said driving circuit operates in the second mode during a printing operation or a typing operation by said apparatus.

9. An apparatus according to claim 8, wherein said driving circuit operates in the first mode when the type of work being performed by said apparatus is a type of work that requires a driving accuracy less than a driving accuracy required when said apparatus is performing a printing operation or a typing operation.

10. An apparatus according to claim 3, further comprising a control circuit operable in the second mode to effect a change in the pulse width of the pulse signal after the frequencies of the frequency signals have been changed by a predetermined value when a value of the pulse width changed in the second mode is outside a predetermined range.

11. An apparatus according to claim 7, wherein said apparatus performs a printing operation, and said driving circuit operates in the second mode when said apparatus performs a printing operation.

12. An apparatus according to claim 11, wherein said driving circuit operates in the first mode when said apparatus is operable in an initial operation immediately after the closing of a power source switch of said apparatus, during the time from an initial operation until the vibration type motor reaches a steady velocity, or during a sheet discharging operation after completion of a printing operation.

13. An apparatus that uses a driving force to perform a plurality of types of work, said apparatus comprising:

a vibration type motor including a vibration member and first and second electro-mechanical energy converting element portions disposed on said vibration member;

a driving circuit that generates first and second frequency signals having different phases and respectively applies the first and second frequency signals to said first and second electro-mechanical energy converting element portions to generate a vibration in said vibration member, thereby generating a driving force of the vibration type motor, said driving circuit being operable in a first mode in which said driving circuit varies the frequencies of the frequency signals applied to said first and second electro-mechanical energy converting element portions to effect driving control, and a second mode in which said driving circuit varies the phase difference between the first and second frequency signals to effect driving control; and a switching circuit that selectively switches the operation mode of said driving circuit to the first mode or the second mode in accordance with the type of work being performed by said apparatus.

14. An apparatus according to claim 13, wherein said switching circuit includes a selecting circuit that selects the second mode when the type of work being performed by said apparatus is a first predetermined type of work which requires high driving accuracy, and selects the first mode when the type of work being performed by said apparatus is a predetermined type of work which does not require high driving accuracy.

15. An apparatus according to claim 13, wherein said apparatus prints or types on a recording medium, and said driving circuit operates in the second mode when said apparatus performs a printing operation or a typing operation.

16. An apparatus according to claim 15, wherein said driving circuit operates in the first mode when said apparatus is operable in an initial operation immediately after the closing of a power source switch of said apparatus, during the time from an initial operation until the vibration type motor reaches a steady velocity, or during a sheet discharging operation after completion of a printing operation.

* * * * *

UNITED STATES PATENT AND TRADEMARK OFFICE
CERTIFICATE OF CORRECTION

PATENT NO. : 6,049,156

DATED : April 11, 2000

INVENTOR(S) : SHINJI YAMAMOTO, ET AL.

It is certified that error appears in the above-identified patent and that said Letters Patent is hereby corrected as shown below:

On the Title Page:
At [57] ABSTRACT

Line 1, "for" should be deleted.
    Line 2, "example" should be deleted.

Column 1

Line 12, "the-case" should rad --the case--.
    Line 55, "However" should read --However,--.

Column 2

Line 48, "However" should read --However,--.
    Line 54, "required" should read --required,--.

Column 3

Line 62, "Generally" should read --Generally,--.

Column 4

Line 47, "enhanced" should read --enhanced,--.
    Line 60, "and" should read --and a--.

UNITED STATES PATENT AND TRADEMARK OFFICE
CERTIFICATE OF CORRECTION

PATENT NO. : 6,049,156

DATED : April 11, 2000

INVENTOR(S) : SHINJI YAMAMOTO, ET AL.

It is certified that error appears in the above-identified patent and that said Letters Patent is hereby corrected as shown below:

Column 5

Line 34, "generated," should read --generated, and--.
    Line 51, "a when" should read --when a--.
    Line 67, "FIG. 1o) a" should read --FIG.10) at a--.

Column 6

Line 25, "it is before" should read --before it is--.

Column 7

Line 44, "of" should be deleted.
    Line 57, "than" should read --other than--.
    Line 58, "inputted" should read --input--.

UNITED STATES PATENT AND TRADEMARK OFFICE
CERTIFICATE OF CORRECTION

PATENT NO. : 6,049,156
DATED : April 11, 2000
INVENTOR(S) : SHINJI YAMAMOTO, ET AL.

It is certified that error appears in the above-identified patent and that said Letters Patent is hereby corrected as shown below:

Column 8

Line 13, "the" (first occurrence) should read --a--.

Column 9

Line 23, "made" should read --advanced--.
    Line 41, "the" (first occurrence) should read --the sign--.
    Line 47, "the" (first occurrence) should be deleted.
    Line 53, "the" (second occurrence) should read --a--.

UNITED STATES PATENT AND TRADEMARK OFFICE
CERTIFICATE OF CORRECTION

PATENT NO. : 6,049,156
DATED : April 11, 2000
INVENTOR(S) : SHINJI YAMAMOTO, ET AL.

It is certified that error appears in the above-identified patent and that said Letters Patent is hereby corrected as shown below:

Column 11

Line 5, "difference" should read --different--.
    Line 23, "where" should read --where,--.

Signed and Sealed this

Third Day of April, 2001

Attest:

NICHOLAS P. GODICI

Attesting Officer     Acting Director of the United States Patent and Trademark Office